(12) United States Patent
Diallo et al.

(10) Patent No.: US 11,467,302 B1
(45) Date of Patent: Oct. 11, 2022

(54) SEISMIC FIRST BREAKS ONSET TIMES DETERMINATION BY INTERFACE TRACKING USING LEVEL-SETS METHOD

(71) Applicant: Saudi Arabian Oil Company, Dhahran (SA)

(72) Inventors: Mamadou Sanou Diallo, Dhahran (SA); Mustafa Almarzooq, Dhahran (SA); Javier Giraldo-Buitrago, Ras Tanura (SA); Abdullah E Qahtani, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 17/330,491

(22) Filed: May 26, 2021

(51) Int. Cl.
*G01V 1/32* (2006.01)
*G01V 1/30* (2006.01)
*G01V 1/34* (2006.01)

(52) U.S. Cl.
CPC ............ *G01V 1/32* (2013.01); *G01V 1/306* (2013.01); *G01V 1/34* (2013.01); *G01V 2210/32* (2013.01); *G01V 2210/41* (2013.01); *G01V 2210/6222* (2013.01)

(58) Field of Classification Search
USPC ............................................................ 702/2
See application file for complete search history.

(56) References Cited

U.S. PATENT DOCUMENTS

| | | | | |
|---|---|---|---|---|
| 3,697,939 | A | * 10/1972 | Musgrave | G01V 1/362 367/54 |
| 8,947,974 | B2 | * 2/2015 | Coman | G01V 1/42 367/27 |
| 2011/0096626 | A1 | 4/2011 | Zhu et al. | |
| 2014/0219054 | A1 | 8/2014 | Mousa et al. | |
| 2017/0068008 | A1 | * 3/2017 | Colombo | G01V 1/288 |
| 2017/0336529 | A1 | 11/2017 | Denli et al. | |

(Continued)

FOREIGN PATENT DOCUMENTS

| | | |
|---|---|---|
| CN | 101551467 A | 10/2009 |
| CN | 101609160 A | 12/2009 |
| CN | 104570087 A | 4/2015 |

(Continued)

OTHER PUBLICATIONS

Al-Mashhor et al., "First Arrival Picking of Seismic Data Based on Trace Envelope", IEEE Access, vol. 7, pp. 128806-128815, 2019.

(Continued)

*Primary Examiner* — Paul D Lee
(74) *Attorney, Agent, or Firm* — Dinsmore & Shohl LLP

(57) ABSTRACT

A method for determining and tracking an edge of first breaks is provided. The method includes obtaining seismic data associated with subsurface formations, the seismic data relating to a vibration contacting a plurality of portions of the subsurface formations, processing the seismic data to produce processed seismic data comprising one or more attributes, wherein the processed seismic data defines an edge characterizing a plurality of onset times, iteratively performing, using a level sets algorithm, a plurality of tracking operations on the processed seismic data to identify the edge characterizing a plurality of first breaks' onset times, and determining the edge as first breaks.

20 Claims, 11 Drawing Sheets

(56) References Cited

U.S. PATENT DOCUMENTS

| | | | | |
|---|---|---|---|---|
| 2019/0293816 A1* | 9/2019 | Yoo | ........................ | G01V 1/32 |
| 2019/0302298 A1* | 10/2019 | Colombo | ............... | G01V 1/364 |

FOREIGN PATENT DOCUMENTS

| | | |
|---|---|---|
| CN | 106646598 A | 5/2017 |
| CN | 108279436 A | 7/2018 |
| CN | 109254323 A | 1/2019 |
| CN | 110441819 B | 10/2020 |
| CN | 112558159 A | 3/2021 |
| WO | 2019118189 A1 | 6/2020 |

OTHER PUBLICATIONS

Deriche et al., "Using Canny's Criteria to Derive a Recursively Imp;lemented Optimal Edge Detector", International Journal of Computer Vision, pp. 167-187, 1987.

Jacobs et al., "A Novel approach to test binarization via a diffusion-based model", Applied Mathematics and Computation, vol. 255, pp. 446-460, 2013.

Malladi et al., "A Topology Independent Shape Modeling Scheme", SPIE vol. 2031, Geometric Methods in Computer Vision II, pp. 246-258, Jun. 1993.

Osher et al., "Fronts Propagating with Curvature-Dependent Speed: Algorithms Based on Hamilton-Jacobi Formulations", Journal of Computational Physics, vol. 79, pp. 12-49, 1988.

Sabbione et al., "Automatic first-breaks picking: New strategies and algorithms", Geophysics, vol. 75, No. 4, p. V67-V76, Jul.-Aug. 2010.

Sakar et al., "On Optimal Infinite Impulse Response Edge Detection Filters", IEEE Transactions on Pattern Analysis and Machine Intelligence, vol. 13, No. 11, Nov. 1991.

Schimmel et al., "Noise reduction and detection of weak, coherent signals through phase-weighted stacks", Ceophys. J. Int. vol. 130, pp. 497-505, 1997.

Sethian, "Numerical Algorithms for Propagating Interfaces: Hamilton-Jacobi Equations and Conservation Laws", J. Differential Geometry, vol. 31, pp. 131-161, 1990.

Torre et al., "On Edge detection", IEEE transaction on Pattern analysis and machine intelligence, vol. PAMI-8(2), pp. 147-163, Apr. 1986.

Ventosa et al., "Window length selection for optimum slowness resolution of the local-slant-stack transform", Geophysics, vol. 77, No. 2, pp. V31-V40, Mar.-Apr. 2012.

Xu et al., "A high accurate automated first-break picking method for seismic records from high-density acquisition in areas with a complex surface", Geophysical Prospecting, vol. 68, pp. 1228-1252, 2020.

Yuan et al., "Seismic waveform classification and first-break picking using convolution neural networks", IEEE Geoscience and Remote Sensing Letters, vol. 15, No. 2, pp. 272-276, 2018.

Notification of Transmittal of the International Search Report and the Written Opinion of the International Searching Authority, or the Declaration dated Jul. 21, 2022 pertaining to International application No. PCT/US2022/024733 dated Apr. 14, 2022.

Sethian, J.A. "Adaptive Fast Marching and Level Set Methods for Propagating Interfaces" Acta Math. Univ. Comenianae,1998, pp. 3-15, vol. LXVII.

* cited by examiner

100

┌─────────────────────────────────────────────────────────────┐
│ OBTAIN SEISMIC DATA ASSOCIATED WITH SUBSURFACE FORMATIONS, THE │
│ SEISMIC DATA RELATING TO A VIBRATION CONTACTING A PLURALITY OF │ ─110
│ PORTIONS OF THE SUBSURFACE FORMATIONS                        │
└─────────────────────────────────────────────────────────────┘
                              ↓
┌─────────────────────────────────────────────────────────────┐
│ PROCESSING THE SEISMIC DATA TO PRODUCE PROCESSED SEISMIC DATA │
│ COMPRISING ONE OR MORE ATTRIBUTES, WHEREIN THE PROCESSED SEISMIC │ ─120
│ DATA DEFINES AN EDGE CHARACTERIZING A PLURALITY OF FIRST BREAK │
│ ONSET TIMES                                                  │
└─────────────────────────────────────────────────────────────┘
                              ↓
┌─────────────────────────────────────────────────────────────┐
│ ITERATIVELY PERFORMING, USING A LEVEL SETS ALGORITHM, A PLURALITY │
│ OF TRACKING OPERATIONS ON THE PROCESSED SEISMIC DATA TO IDENTIFY │ ─130
│ THE EDGE CHARACTERIZING THE PLURALITY OF FIRST BREAK ONSET TIMES │
└─────────────────────────────────────────────────────────────┘
                              ↓
┌─────────────────────────────────────────────────────────────┐
│ DETERMINING THE EDGE AS THE FIRST BREAKS                     │ ─140
└─────────────────────────────────────────────────────────────┘

FIG. 1

SEISMIC FIRST BREAKS ONSET TIMES DETERMINATION BY INTERFACE TRACKING USING LEVEL-SETS METHOD

TECHNICAL FIELD

The present disclosure relates to determining first breaks associated with seismic data, and more specifically, to determining first breaks' onset times associated with seismic data by iteratively performing a plurality of tracking operations on processed seismic data with the use of a level sets method.

BACKGROUND

One of the biggest challenges the oil and gas industry faces today is accurately and efficiently identifying instances of first breaks of seismic data associated with seismic waves that travel through formations in the surface and the sub-surface levels. Accurate identification and estimation of onset times of these first breaks may enable a more accurate determination and estimation of velocities with which seismic waves travel through these formations, especially for near-surface model inversion. Such accurate velocity, in turn, enable for the generation of a velocity model of the subsurface portions of these formations that is geologically consistent and accurate.

Accordingly, there is a need for accurately tracking and determining onset times of first breaks from seismic data of seismic waves in order to generate a geologically consistent velocity model of near surface portions of various formations.

SUMMARY

In one aspect, a method for determining and tracking an edge corresponding to first breaks is provided. The method comprises obtaining seismic data associated with subsurface formations, the seismic data relating to a vibration contacting a plurality of portions of the subsurface formations, processing the seismic data to produce processed seismic data comprising one or more attributes, wherein the processed seismic data defines an edge characterizing a plurality of onset times, iteratively performing, using a level sets method, a plurality of tracking operations on the processed seismic data to identify the edge characterizing a plurality of first breaks' onset times, and determining the edge as the first breaks' onset times.

In another aspect, a non-transitory computer-readable medium storing instructions is provided. These instructions, when executed by one or more processors of a computing device, cause the computing device to obtain seismic data associated with subsurface formations, the seismic data relating to a vibration contacting a plurality of portions of the subsurface formations, process the seismic data to produce processed seismic data comprising one or more attributes, wherein the processed seismic data defines an edge characterizing a plurality of first breaks' onset times, iteratively perform, using a level sets method, a plurality of tracking operations on the processed seismic data to identify the edge characterizing the plurality of first breaks' onset times, and determine the edge as the first breaks' onset times.

In yet another aspect, another method for determining and tracking an edge corresponding to first breaks is provided. The method includes processing seismic data to produce processed seismic data comprising one or more attributes, wherein the processed seismic data defines an edge characterizing a plurality of onset times, iteratively performing, using a level sets method, a plurality of tracking operations on the processed seismic data to identify the edge characterizing the plurality of onset times, and determining the edge as the first breaks' onset times.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and example in nature and not intended to limit the subject matter defined by the claims. The following detailed description of the illustrative embodiments can be understood when read in conjunction with the following drawings, where like structure is indicated with like reference numerals and in which:

FIG. 1 depicts a flowchart of an example system described herein that is configured to track an edge characterizing first breaks' onset times associated with seismic data and determining the edge as the first breaks based on implementation of a level-sets method based image segmentation operation, according to one or more embodiments described and illustrated herein;

DETAILED DESCRIPTION

Figure 2:
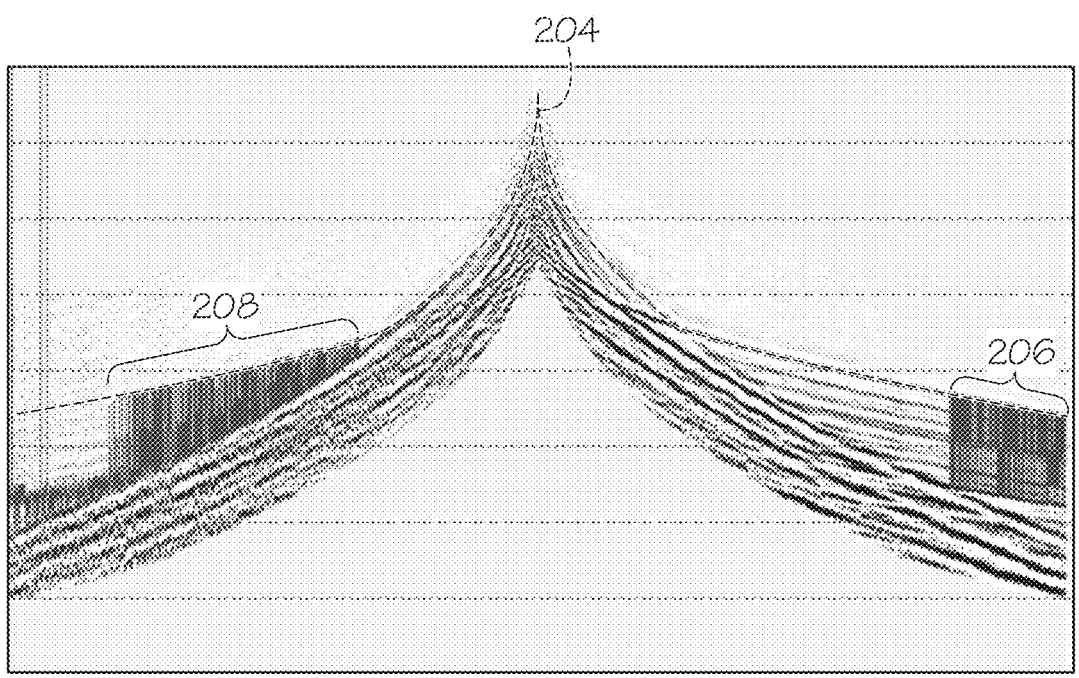
FIG. 2 illustrates various problems associated with conventional first breaks picking techniques, namely the erroneous selections of first breaks, according to one or more embodiments described and illustrated herein.

Conventional techniques of determining onset times of first breaks from seismic data have numerous deficiencies. These techniques result in the inaccurate selection of the time of arrivals or onset times of a seismic wave across various receivers. Such inaccurate selection may be due to noise or interference from various sources operating within a certain proximity of these receivers. For example, duties performed by engineers, technicians, and personnel within a certain proximity of these receivers may generate noise and interference that results in sudden spikes or variations in seismic traces detected by these receivers, e.g., during a time at which these receivers may detect (i.e. receive) a vibration (e.g., a seismic wave) generated by and transmitted from a particular source. Consequently, the variations in the seismic traces due to the interference may mask the time of arrivals or first breaks' onset times of the seismic wave. In short, noise and interference from activity near these receivers may result in an inaccurate selection of the time of arrivals of the vibration or seismic wave, resulting in a false or inaccurate determination of first breaks' onset times. It is noted that, prior to reaching these receivers, the generated seismic wave reaches and travels through various portions of the earth's surface and/or subsurface as direct waves, refracted waves, and/or diving waves. The determination of first breaks' onset times as described in the present disclosure is based on using direct waves, refracted waves, and diving waves.

Embodiments of the present disclosure address and overcome these limitations. Specifically, the present disclosure is directed to methods and systems for determining an edge within a graphical representation corresponding to first breaks' onset times, leading to the accurate determination of first breaks. In embodiments, the first breaks are determined based on performing extensive processing of seismic data and iteratively performing a plurality of front tracking operations on the seismic data in order to identify the edge (corresponding to a plurality of first breaks' onset times) as the first breaks. The plurality of front tracking operations may be implemented as part of a level-sets method based image segmentation operation. Additionally, it is noted the first breaks' onset times are based on the seismic waves travelling from a source location, reaching portions of subsurface formations, refracting from these portions, and thereafter being received by each of the plurality of receivers located at various distances from the source location. The seismic waves being received by each of the plurality of receivers located at various distances from the source location may also be a diving wave or a direct wave. The time of arrivals (i.e., first breaks' onset times) of the direct waves, refracted, and diving waves are utilized to estimate a geologically consistent velocity model of the shallow and near surface portions of formations. Additionally, the implementation of the level-sets method based image segmentation operation results in the accurate determination of first breaks' onset times. It is also noted that details regarding the implementation of the image segmentation operation are described in greater detail later on in this disclosure.

FIG. 1 depicts a flowchart of an example system described herein that is configured to track an edge characterizing first breaks' onset times associated with seismic data and determining the edge as the first breaks based on implementation of a level-sets method based image segmentation operation, according to one or more embodiments described and illustrated herein.

In block 110, a computing device 104 (depicted in FIG. 12, but not shown in FIG. 1) may obtain and store seismic data associated with surface and subsurface level formations. The seismic data relates to a seismic wave that reaches one or more of a plurality of portions of these surface or subsurface level formations. In embodiments, the seismic data may be generated and obtained with the use of a vibration or seismic source (e.g., artificial seismic wave generating component that is installed in a remote, seismic source device. In embodiments, the seismic source device may be communicatively coupled with the computing device 104. The seismic source device may generate a vibration (sound based vibration) or seismic wave from a particular source location. Upon generation, the seismic wave may reach a plurality of portions on the surface formations (e.g., rocks, and so forth) and a plurality of portions at subsurface levels of these formations. After reaching the near surface and subsurface formations, the vibration or seismic wave may be refracted from interfaces or portions of these formations, and travel in various directions. The seismic wave may also be a diving wave or a direct wave. The refracted, direct, or diving wave may then arrive at and be recorded by each of the plurality of receivers.

In embodiments, the data relating to the distance between the source location (i.e. location of the seismic source device) and the receivers, the refracted, or diving seismic wave trajectory and direct arrivals, first breaks' onset times, and so forth, may be utilized to determine velocities characterizing the geological formations affected by these waves. These velocities correspond to the speed with which the vibration or seismic wave is able to travel from the source location to the interfaces or portions of the subsurface formations, refract from these portions or interfaces, and reach the plurality of receivers. In particular, the time of arrival data of the seismic waves, the trajectory of the refracted wave, diving and directly traveling seismic waves, and so forth, may be utilized to generate a geologically consistent velocity model of the near surface portions of these formations.

In embodiments, the data may also indicate that the seismic wave travels faster through certain portions of the formations and travels rather slowly through other portions. Such velocity differentials may be indicative of the properties of these formations. Further, it is noted that, in order to accurately determine velocities of the vibration relative to various portions of the formations (e.g., to generate a velocity model as described in the present disclosure), an accurate determination of the time of arrivals of the vibration at the receivers is useful. The time of arrivals or first breaks' onset times enable for an accurate determination of the velocity values, which in turn enables the determination of other properties of these formations (e.g., interfaces' boundaries, and subsurface location, extent and shape of these formations, and so forth).

Additionally, the present disclosure relates to techniques that enable the accurate determination of time of arrivals or first breaks' onset times, leading to a determination of first breaks' onset times (e.g., using the level-sets based image segmentation operation described in the present disclosure). Specifically, these techniques include processing the seismic data and iteratively performing a plurality of edge tracking operations on the processed seismic data in order to identify an edge characterizing first breaks' onset times, and determine the edge as the first breaks. The detailed implementations of these techniques are described later on in this disclosure.

Prior to describing the determination of first breaks using the techniques of the first breaks tracking system described herein, limitations of conventional first breaks selection techniques and systems are instructive.

FIG. 2 illustrates various problems associated with conventional first breaks selection techniques. Specifically, FIG. 2 depicts a plurality of erroneous selections of first breaks' onset times. In various conventional embodiments, a vibration generating device (e.g., a seismic source device) may be located at a particular location, e.g., source location 204, and a plurality of discrete receivers may be placed at predefined intervals from each other and over certain distances away from the source. For example, a plurality of receivers may be placed within a distance range of a few meters to several kilometers away from the vibration generating device, and each receiver may be separated from a neighboring receiver by a distance of 12.5 to 50 meters as an example. In other words, a set of first receivers may be placed spatially at a distance of 12.5 meters away from the source, while a second set of receivers may be positioned at a distance of 25 meters from the source, and so on. Other spatial layouts of receivers' are also contemplated.

Conventionally, the vibration generation device may generate a seismic vibration that emanates from the vibration or seismic wave generation device, reaches various portions of the earth's surface or subsurface, and is then received by one or more of the plurality of receivers positioned at various intervals. The first onset of the seismic vibration or seismic wave emanating from the source and arriving at these receivers corresponds to the first breaks' onset times (It is noted that these onset times may be determined based on direct waves, diving waves, and/or refracted waves). As stated, utilizing the first breaks arrival times of the seismic vibration at the plurality of receivers and seismic tomography method, a velocity model of the near surface portions of various formations may be determined. Additionally, the derived near surface velocity model can be used to build a more detailed velocity model of the subsurface for seismic migration and inversion.

Referring to FIG. 2, the illustrated dotted line indicates a trend line that corresponds to positions associated with an accurate determination of the first breaks' onset times. As illustrated, the dotted line extends from the source location 204 to various destination locations, without any discernable deviations (e.g., upward or downward curving portions, distortions, etc.). Specifically, the dots along the dotted trend line are representative of onset times or times of arrivals of the seismic wave at the plurality of receivers. The seismic wave may be a direct wave, diving wave, or refracted wave. It is noted that the times of arrivals are largely uniform across the plurality of receivers, but the times of arrivals are not equal. In particular, as the paths followed by parts or portions of the seismic waves varies, the first breaks' onset times of the seismic wave also varies across these plurality of receivers.

However, using conventional systems and techniques, a plurality of incorrect selections of first breaks associated with the generated seismic waves may occur. Various incorrect selections may be made that correspond to spikes or fluctuations indicated as in fluctuation clusters 206, 208. Each of the fluctuations in the fluctuation clusters 206, 208 corresponds to a different time of arrival of the vibration or seismic wave at respective receivers. Such variations demonstrate a clear deviation from the uniform predicted first breaks' onset times as shown by the dotted trend line. In embodiments, as the plurality of receivers may only be positioned approximately 25 to 30 meters apart, such spikes may be representative of time differentials of, e.g., 250 milliseconds. Such time differentials are indicative of and result in significant errors in the selection of first breaks.

Returning to the flow chart of FIG. 1, in block 120, the computing device 104 may process the seismic data gathered by the system described herein in order to produce processed seismic data that comprises one or more attributes. The one or more attributes include one or more of envelope value, instantaneous frequency value, and instantaneous phase value (e.g., instantaneous phase attribute).

The processed seismic data defines an edge characterizing a plurality of first breaks' onset times. It is noted that the processing of the seismic data include includes applying one or more edge smoothing processes to one or more attributes derived from the seismic data. The edge smoothening processes may include one or more of de-trending, scaling, and normalization processes. The seismic data includes the time of arrival data or first breaks' onset times associated with the vibration or seismic wave described above, and variations in seismic traces that are captured or determined in association with the onset times of the vibration. And due to the interference, noise, and distortions, identifying the variations in seismic traces that correspond to onset times of the vibration at a particular receiver may be a challenge. To address this challenge, the system described herein processes the data in specific ways.

Figure 3:
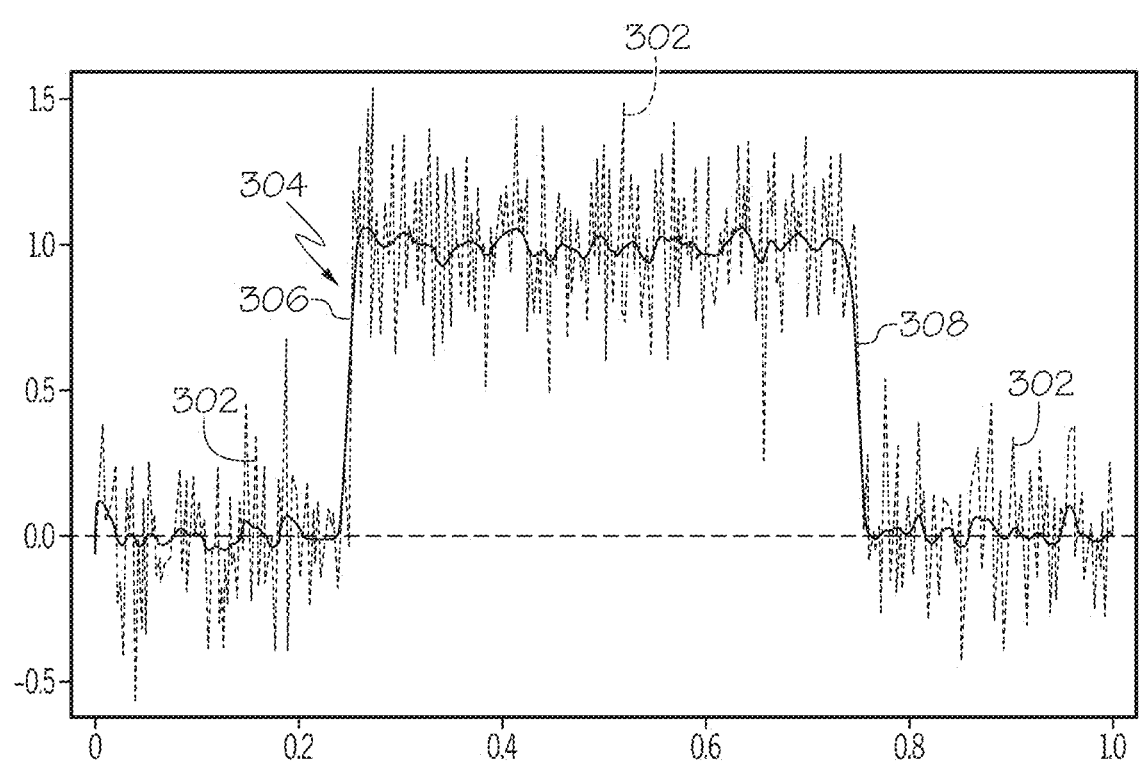
FIG. 3 illustrates a processing step that is performed on synthetic data that involves an edge preserving step, eliminates high frequency noise associated with a signal, according to one or more embodiments described and illustrated herein.

FIG. 3 illustrates a processing step that is performed on synthetic data—and can be used on actual data—that involves an edge preserving step, which eliminates the high frequency noise associated with a signal, according to one or more embodiments described and illustrated herein. Specifically, FIG. 3 depicts two distinct graphic elements or representations simultaneously. The first graphical representation 302 is defined by a pattern of lines that traverse upwards and downwards in a rapid fashion, while a second graphical representation 304 includes a sharp upward moving portion 306 followed by a sharp downward moving portion 308. In embodiments, the first graphic representation 302 represents a raw and unprocessed version of the seismic data (variations in seismic traces that are captured or determined in association with the times of arrivals of the seismic wave), and the second graphic element 304 (solid line) is representative of the processed version of the seismic data, which better enables the identification of the pulse signal. The pulse signal may be indicative of a variation of a seismic trace captured by a receiver responsive to receiving a vibration at a particular point in time. It is noted that a binarization operation may be performed on the synthetic data in order to eliminate the high frequency noise included in the signal. As such, the rapid swings of upward and downward movements representative of the noise elements are reduced or eliminated and the sudden increase in amplitude, represented by the sharp upward moving portion 306, is better illustrated.

Other graphical representations, described in greater detail later on in this disclosure, are also indicative of such variations.

In order to clearly identify the variation in a seismic trace (e.g., change in amplitude of the seismic trace as illustrated in the second graphic representation), a Hilbert Transform operation may be performed on the seismic data. It is noted that the Hilbert Transform algorithm is a signal processing algorithm that is often used for determining instantaneous attributes of a time series, especially the amplitude and the frequency values associated with a time series values of a signal. Performing of the Hilbert transform enables the determination of various attributes of the seismic data described above. Thereafter, a normalization operation may be performed on the identified amplitude values.

Figure 4A:
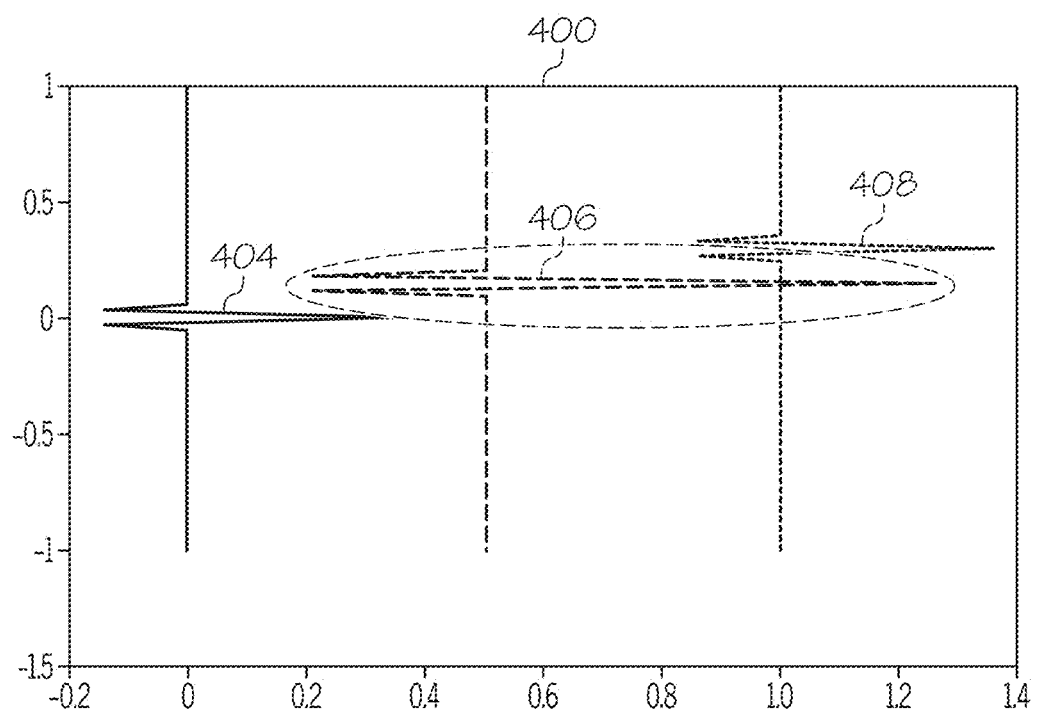
FIG. 4A depicts graphical representations of pulse waves having different amplitude values, which may be corrected based on a normalization operation, according to one or more embodiments described and illustrated herein.

FIG. 4A depicts graphical representations of pulse waves having different amplitude values, which may be corrected based on the performance of normalization processes or operations, according to one or more embodiments described and illustrated herein. Specifically, after a Hilbert transform operation is performed on the seismic data, a plurality of amplitude values associated with seismic traces included in the seismic data may be identified and generated as part of an example graphical representation 400. As shown, the example graphical representation 400 includes three distinct pulse waves—example pulse wave 404, example pulse wave 406, and example pulse wave 408. Each of these pulse waves has a different amplitude value. The example pulse wave 406 has an amplitude value that is higher than the amplitude values of example pulse waves 404 and 408.

Figure 4B:
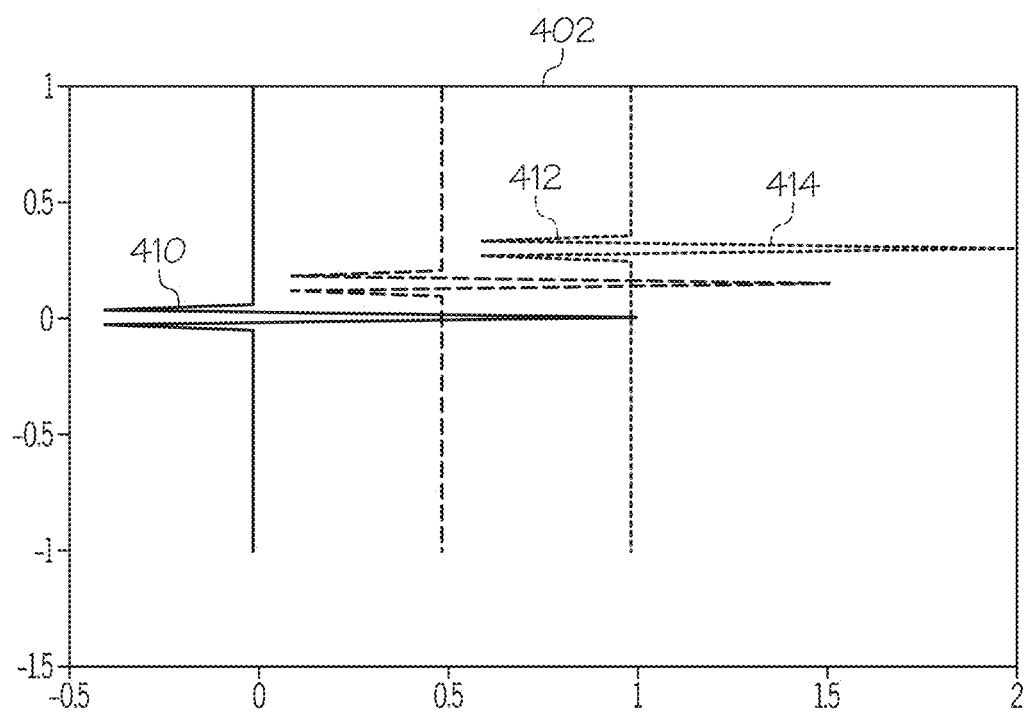
FIG. 4B depicts a correction of one of the pulse waves using a normalization operation, according to one or more values described and illustrated herein.

FIG. 4B depicts a correction of one of the pulse waves using a normalization operation, according to one or more values described and illustrated herein. In order to remove this distortion, a normalization operation may be performed by the computing device 104, as a result of which the amplitude values of all three example pulse waves 404, 406, and 408 is equalized. The shape and dimensions of the equalized example pulse waves correspond to example pulse waves 410, 412, 414. It is noted that the example pulse waves 410, 412, 414 are included as part of an example graphical representation 402. Additionally, the phase value associated with these pulse waves is also preserved. Thereafter, a de-trending operation may also be performed on the seismic data. It is noted that the de-trending operation may be performed prior to, simultaneously with, or after the performing of the normalization operation.

Figure 4C:
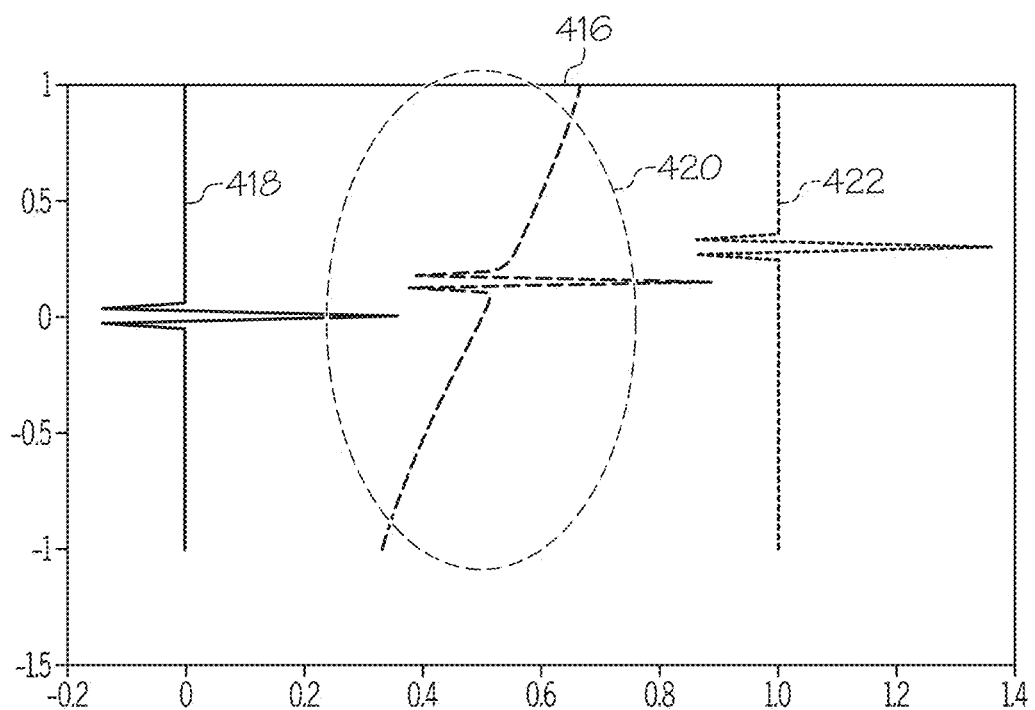
FIG. 4C depicts an example graphical representation of example pulse waves with one of the example pulse waves having a slanted portion (i.e. including a low frequency component), which may be corrected using a de-trending operation, according to one or more embodiments described and illustrated herein.

FIG. 4C depicts an example graphical representation of example pulse waves with one of the example pulse waves having a slanted portion (i.e. with a low frequency component), which may be corrected using a de-trending operation, according to one or more embodiments described and illustrated herein. Specifically, FIG. 4C includes example pulse waves 418, 420, 422, with the example pulse wave 420 having a slanted portion that deviates significantly from the values of the example pulse waves 418, 422. The example pulse wave 420 having the slanted portion corresponds to the low frequency component.

Figure 4D:
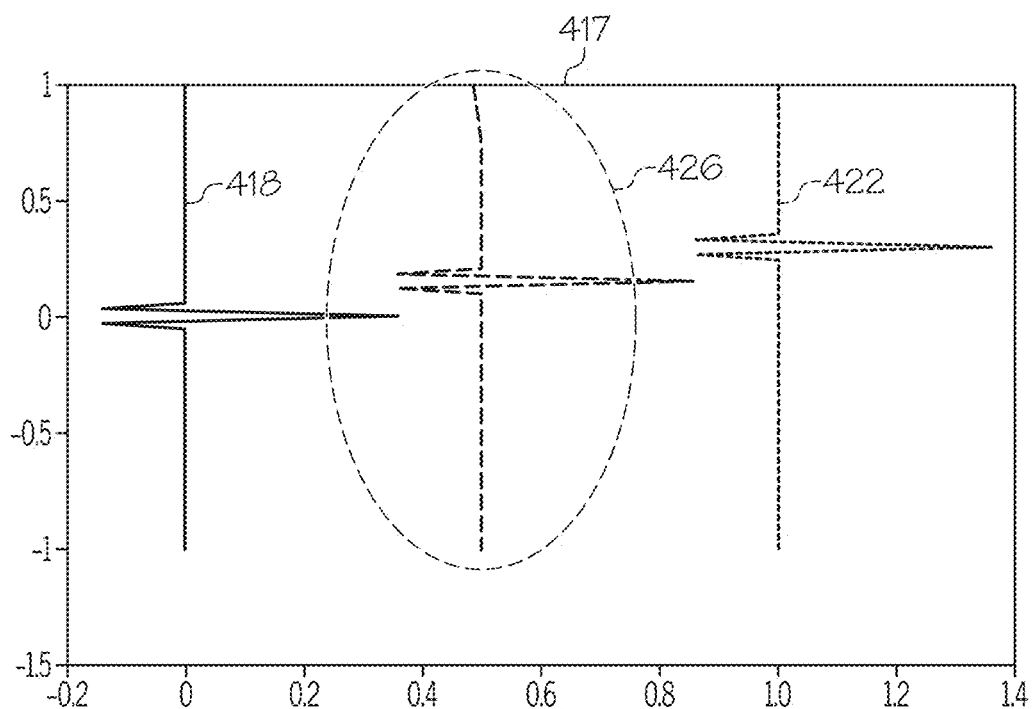
FIG. 4D depicts an example graphical representation in which a slanted portion (i.e. with a DC component) of a pulse wave is corrected using a normalization operation, according to one or more embodiments described and illustrated herein.

FIG. 4D depicts an example graphical representation in which a slanted portion of a pulse wave is corrected using a de-trending operation, according to one or more embodiments described and illustrated herein. Upon completion of the de-trending operation, the slanted portion of the pulse wave 420 may be corrected such that the shape of the example pulse wave 420 is now that of the corrected example pulse wave 426. Such processing steps eliminate instances of distortions, interferences, and so forth included in the data in order to facilitate the identification and extraction of more specific characteristics of the data. It is noted that the principles of de-trending and normalization may also be performed on actual raw seismic data (as opposed to synthetic seismic data).

Figure 5:
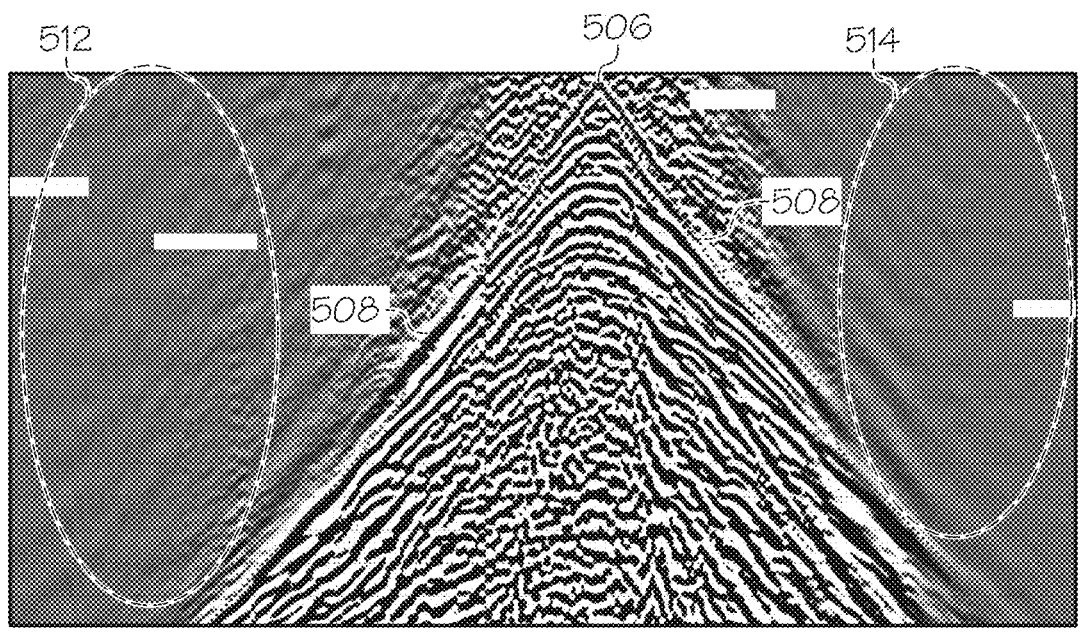
FIG. 5 depicts a graphical representation of obtained and unprocessed seismic data on which dotted lines corresponding to an estimation of first breaks' onset times are provided, according to one or more embodiments described and illustrated herein.

FIG. 5 schematically depicts a graphical representation of obtained and unprocessed seismic data on which dotted lines corresponding to an estimation of first breaks' onset times is provided, according to one or more embodiments described and illustrated herein. In FIG. 5, an example vibration or seismic wave (as described above) may be generated by vibration generation device from position 506. Thereafter, as illustrated in FIG. 5, an estimation of the time of arrivals of the example vibration may be performed (e.g., by the computing device 104), which corresponds to each of the dots on the dotted line that extends from the position 506 along a diagonal line. As described above, the plurality of receivers (e.g., one or more sensors) may be positioned at certain predefined intervals and are associated with the various points of or along the dotted lines. The dotted lines are also drawn on a delineation 508 that corresponds to the first break onset times or times of arrivals of the vibration or seismic wave at each of the plurality of receivers.

Additionally, it is noted that the light grey portions marked by the portion markers 512 and 514 (and portion on the interior of the delineation 508) are indicative of interferences that may distort the accurate determination of the first breaks. These interferences may be detected by the plurality of receivers prior to the reception of the vibration and may be caused by various factors. For example, the interferences may be due to noise caused by engineers, technicians, and other personnel performing various duties within a certain proximity of the plurality of receivers. The interferences may also be caused by vehicles traveling within a certain proximity of the plurality of receivers, drilling equipment or other machinery operating within a certain proximity of the plurality of receivers, and so forth. The processing steps described in the present disclosure will eliminate or minimize the adverse effects of such interferences and enable, in part, the accurate identification of first breaks' onset times. Details regarding these processing steps are described later on in this disclosure.

Figure 6:
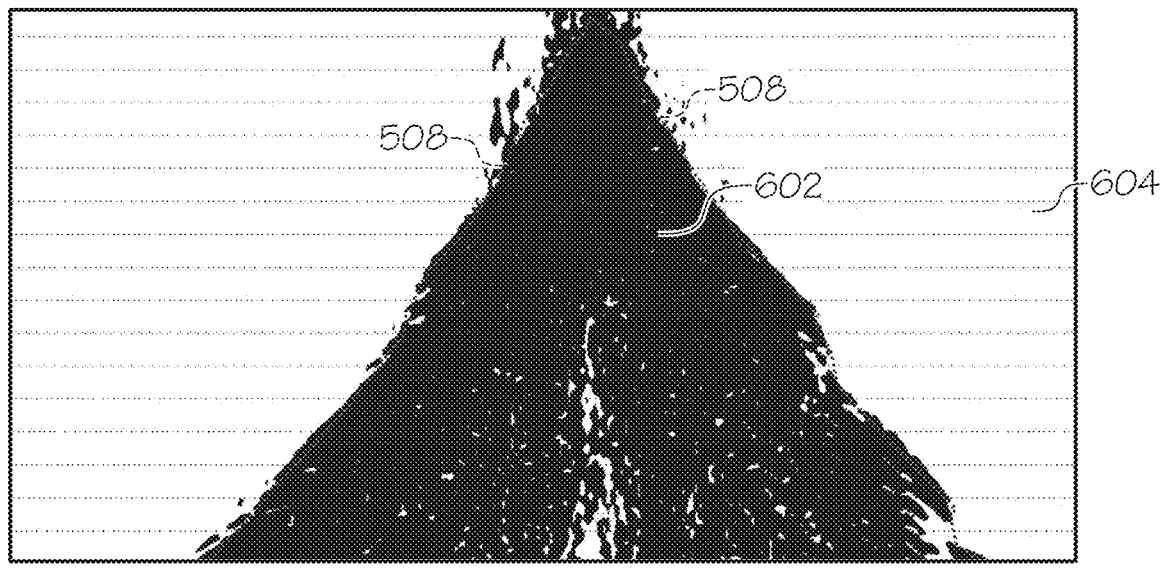
FIG. 6 depicts a graphical representation that may be generated as a result of performing a Hilbert Transform on the raw data described in FIG. 5 to determine envelope data of unprocessed seismic data, according to one or more embodiments described and illustrated herein.

FIG. 6 schematically depicts a graphical representation that may be generated as a result of performing a Hilbert Transform on the raw data described in FIG. 5 to determine envelope data of unprocessed seismic data, according to one or more embodiments described and illustrated herein. It is noted that envelope data (also known simply as an envelope) refers to a magnitude value of a signal that corresponds to a smooth curve that outlines the extremes of a particular signal. In other words, the performing of the Hilbert Transform operation facilitates the identification of the boundaries of a particular signal, in this case the vibration or seismic wave that is received at various first breaks' onset times at each of the plurality of receivers. The data associated with the vibration signal is included in the unprocessed seismic data. In FIG. 6, upon the performance of the Hilbert Transform operation, the delineation 508 between the seismic data represented by the example internal area 602, and the example external area 604 is readily visible and identifiable. In other words, a boundary between the example internal area 602 and the example external area 604, which corresponds to the first breaks' onset times or time of arrivals of the seismic wave at the plurality of receivers is identifiable. Thereafter, a level-sets method based image segmentation operation may be iteratively performed to determine or derive an accurate first breaks' onset times.

Figure 7:
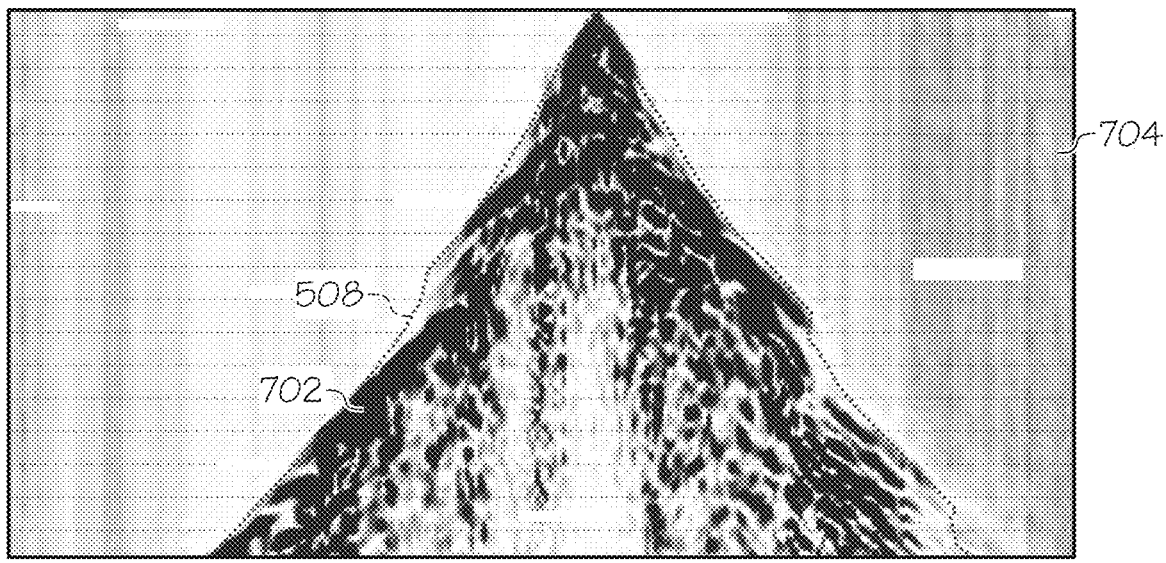
FIG. 7 depicts a graphical representation that may be generated as a result of performing a de-trending operation on the envelope data, according to one or more embodiments described and illustrated herein.

FIG. 7 schematically depicts a graphical representation that may be generated, by the computing device 104, as a result of performing a de-trending operation on the envelope data, according to one or more embodiments described and illustrated herein. In embodiments, as a result of performing the de-trending operation, a plurality of distortions or anomalies in the seismic data may be reduced or eliminated. For example, portions of pulse waves associated with the seismic data that do not conform to the shape and dimensions of similar or identical pulse waves separated by certain phase values, may be corrected. As previously described, examples of such corrections, as illustrated in FIG. 4C, may include straightening a portion of a pulse wave signal such that any slants or deviations (e.g., low frequency components) in the pulse wave relative to other similar or identical pulse waves (separated by a certain phase) are removed. Other distortions, deviations, and so forth, may also be corrected. In this way, the processing steps of performing a Hilbert Transform to identify envelope data and a de-trending operation for eliminating distortions further emphasizes the delineation 508, which is the boundary between the example internal area 702 and the example external area 704.

Figure 8:
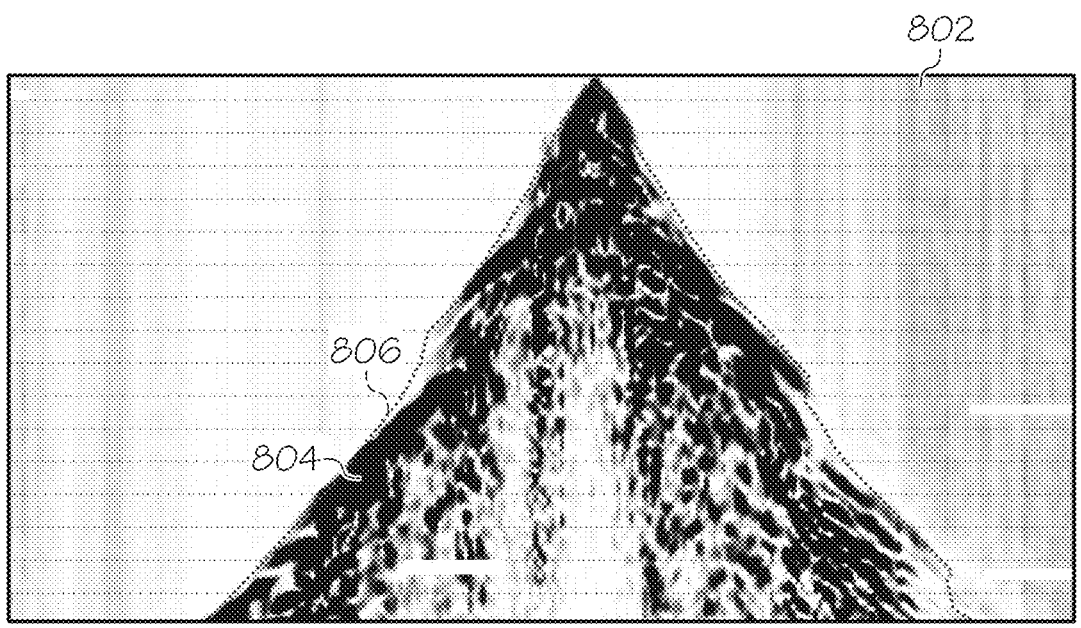
FIG. 8 depicts a graphical representation that may be generated as a result of performing a normalization operation on the envelope data upon which a de-trending operation is performed, according to one or more embodiments described and illustrated herein.

FIG. 8 schematically depicts a graphical representation that may be generated, by the computing device 104, as a result of performing a normalization operation on the envelope data upon which a de-trending operation is performed, according to one or more embodiments described and illustrated herein. In embodiments, the performing of a normalization operation by the computing device 104 may be utilized to reduce or eliminate additional distortions in the seismic data. For example, as described earlier in this disclosure and illustrated in FIG. 4D, a normalization operation would remove distortions in an amplitude value of a pulse wave, which may vary significantly from another pulse wave that is separated by a certain phase value but should have a form that is similar or identical to the distorted pulse wave. Removing distortions may include reducing or increasing the amplitude value of a particular pulse wave to match other pulse waves associated with the seismic data. It is noted that various ways of adjusting or modifying the amplitude values of pulse waves (or other waves) are contemplated as part of the normalization process. In short, a result of the normalization operation ensures that a shape of a signal matches or is uniform with additional signals.

Figure 9A:
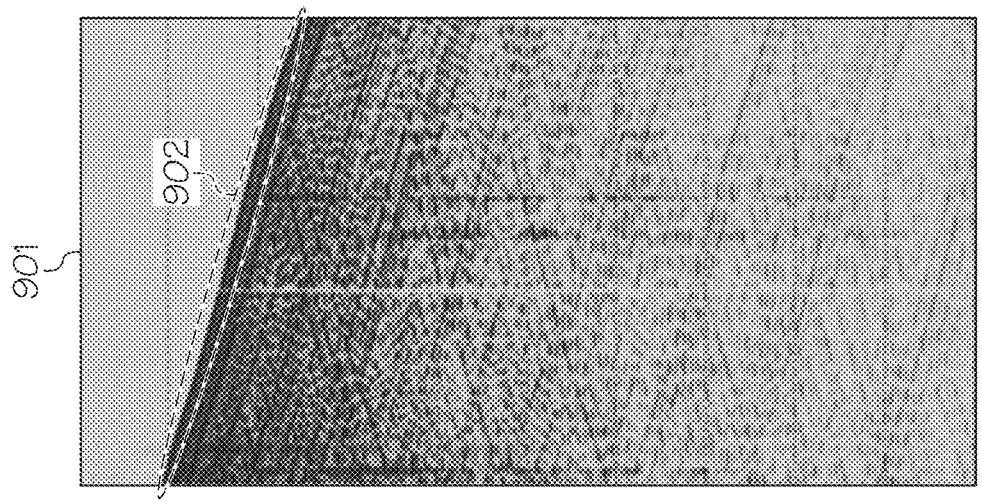
FIG. 9A depicts an example graphical representation associated with unprocessed seismic data corresponding to seismic traces that are recorded by a particular receiver, as part of a vertical seismic profile (VSP) seismic dataset, according to one or more embodiments described and illustrated herein.

FIG. 9A schematically depicts an example graphical representation 901 associated with unprocessed seismic data corresponding to seismic traces that are recorded by a particular receiver as part of a Vertical Seismic Profile data set (VSP seismic data), according to one or more embodiments described and illustrated herein. It is noted that the example graphical representation 901 is representative of and related to a VSP seismic data set that varies from the seismic dataset associated with the graphical representations illustrated in FIGS. 9B and 9C.

As illustrated in FIG. 9A, a delineation 902 corresponds to first breaks that are determined from the VSP seismic data. As shown, the example delineation 902 is visible in an area where there is a marked textural variation or contrast between the area to the right of the example delineation 902 and the area to the left of the example delineation 902. The marked textural variation or contrast between these areas is representative of an abrupt change from the area to the right and above the example delineation 902 (which may be representative of sound waves or activity with low or minimal noise) and the area to the left and below the example delineation 902 (which may be representative of sound waves with a higher level of noise). In other words, the delineation 902 is an abrupt transition that is representative of the first breaks' onset times, leading to the determination of first breaks. It is further noted that FIG. 9A depicts a high contrast of amplitude, but does not include the performing of a binarization operation on the VSP seismic data.

Figure 9B:
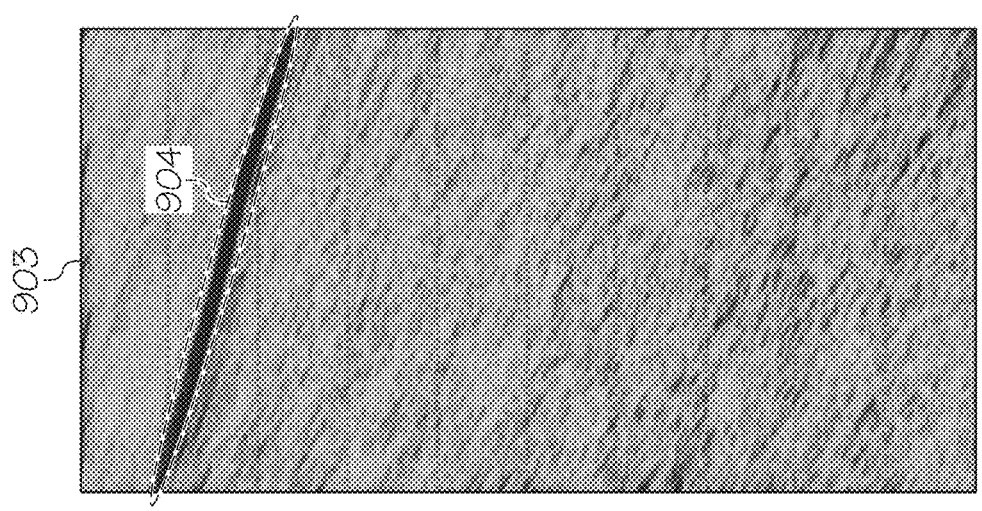
FIG. 9B depicts an example graphical representation of a coherence operation performed on unprocessed seismic data, according to one or more embodiments described and illustrated herein.

FIG. 9B schematically depicts an example graphical representation 903 of a coherence operation performed, using the computing device 104, on unprocessed seismic data, according to one or more embodiments described and illustrated herein. In embodiments, the coherence operation is based on the use of phase weighted stacks. The purpose of the phase weighted stacks approach is to suppress signals in the unprocessed seismic data that is incoherent. To achieve this, the computing device 104 uses the phase stack as a time-dependent weight of the linear stack. The suppression of the incoherent signals results in a comparable enhancement of weak coherent signals. This process, which may be performed by the computing device 104, may be utilized to identify pertinent seismic events from unprocessed seismic data, namely the example delineation 904, which corresponds to an abrupt change or spike, leading to the accurate identification or determination of the first breaks.

Figure 9C:
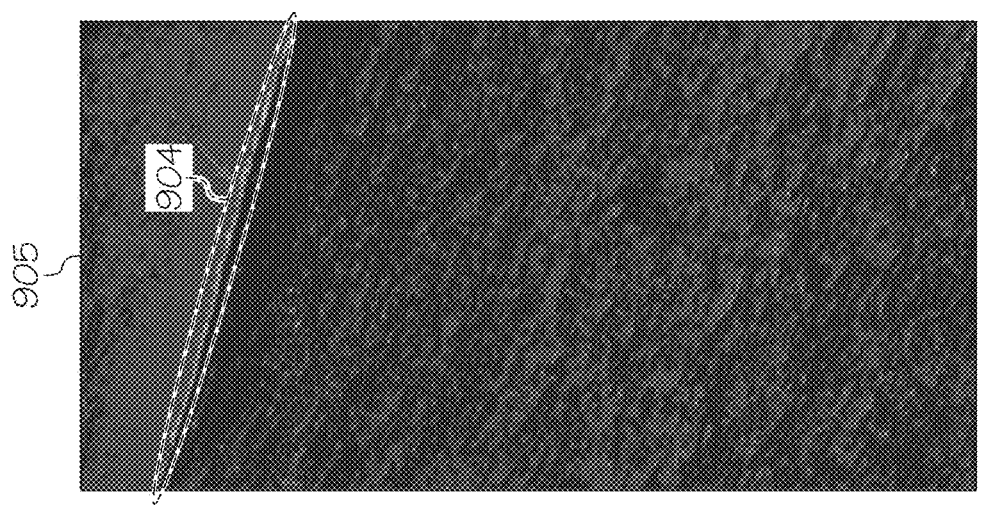
FIG. 9C depicts an example graphical representation of a phase map that is generated subsequent to a coherence operation performed on seismic data, according to one or more embodiments described and illustrated herein.

FIG. 9C schematically depicts an example graphical representation 905 of a phase map that is generated, using the computing device 104, subsequent to a coherence operation performed on seismic data, according to one or more embodiments described and illustrated herein. In embodiments, a phase map may be generated by performing a Hilbert Transform on unprocessed seismic data upon which a coherence operation was performed. Such an operation results in an emphasis of the example delineation 904, leading to an accurate determination of the first breaks of the seismic wave. It is further noted that a binarization operation is performed on the seismic data, which further emphasizes the contrast between the region on the top right portion of the example delineation 904 and the region on bottom left portion of the example delineation 904. In other words, the binarization process further emphasizes the delineation 904, which corresponds to first breaks' onset times, and leads to the accurate identification and determination of the first breaks.

Figure 10B:
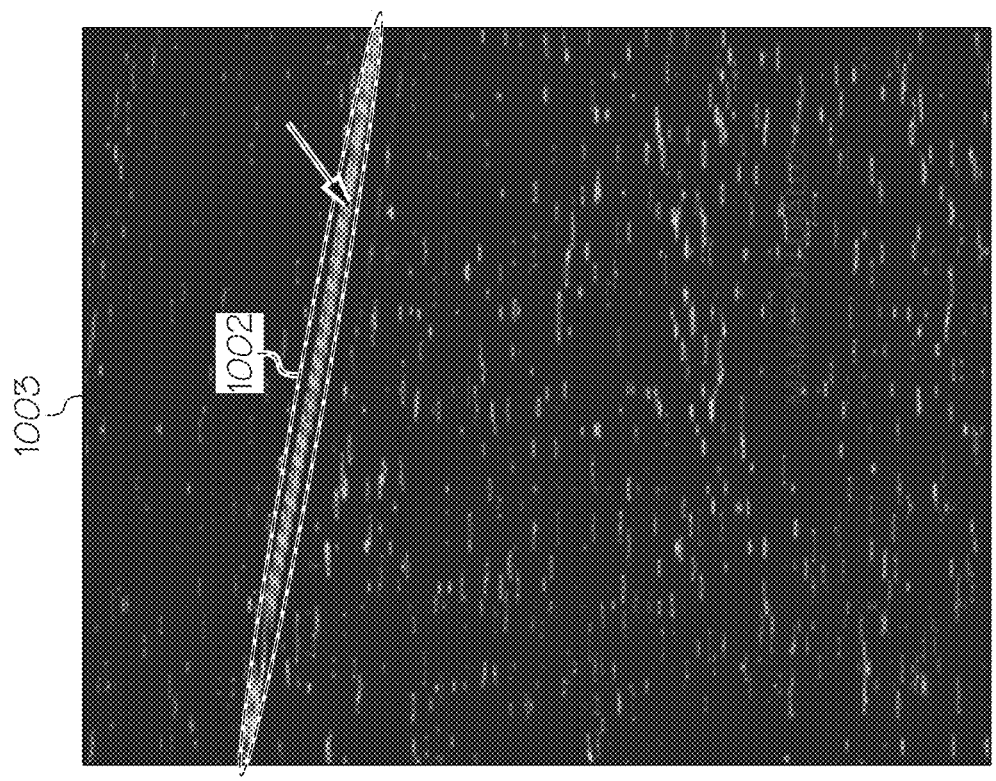
FIG. 10B schematically depicts an example graphical representation based on the identification of an instantaneous frequency value from the unprocessed VSP seismic data of FIG. 10A, according to one or more embodiments described and illustrated herein.
Figure 10A:
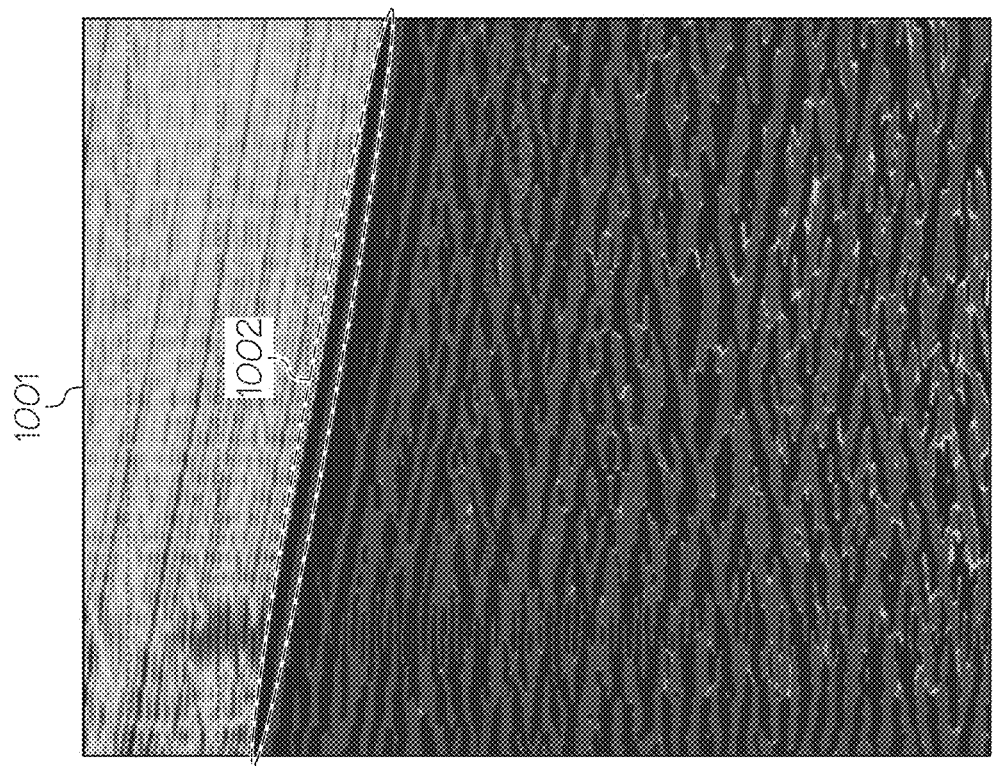
FIG. 10A schematically depicts an example graphical representation associated with unprocessed VSP seismic data, according to one or more embodiments described and illustrated herein.

FIG. 10A schematically depicts an example graphical representation 1001 associated with unprocessed VSP seismic data, according to one or more embodiments described and illustrated herein. In the example graphical representation 1001, an example delineation 1002 corresponds to the first breaks' onset times or first seismic wave time of arrivals described in the present disclosure and may require further emphasis. The computing device 104 may identify an instantaneous frequency value associated with the unprocessed seismic data in order to facilitate this further emphasis.

FIG. 10B schematically depicts an example graphical representation 1003 based on the identification of an instantaneous frequency value from the unprocessed VSP seismic data of FIG. 10A, according to one or more embodiments described and illustrated herein. In embodiments, a Hilbert Transform operation may be performed on the unprocessed VSP seismic data to identify an instantaneous frequency value, and a graphical representation associated with the identified instantaneous frequency value may be generated. The generation of the instantaneous frequency value and a subsequent generation of the example graphical representation 1003 of the instantaneous frequency value results in a sharp and discernable emphasis of a discontinuity (i.e., identifying discontinuity features), which corresponds to accurate first breaks' onset times or first seismic wave time of arrivals at the plurality of receivers, which will then lead to a determination of first breaks' onset times. It is further noted that the computing device 104 may also determine an instantaneous phase value or a plurality of instantaneous phase values associated with the seismic data.

Returning to the flow chart illustrated in FIG. 1, in step 130, the computing device 104 may iteratively perform, using a level sets algorithm, a plurality of tracking operations on the processed seismic data to identify the edge characterizing the plurality of first breaks' onset times. Additionally, in step 140, the computing device 104 may determine the edge representative of the plurality of first breaks' onset times as first breaks.

FIGS. 11A, 11B, 11C, and 11D schematically illustrate an image segmentation operation, performed based on a level sets method, which enables tracking of areas surrounding a delineation corresponding to the time of arrivals or first breaks' onset times of the vibration. The plurality of tracking operations are performed using a level-sets method based image segmentation operation. In embodiments, the level-sets method or technique is based on moving surfaces and surfaces with curvature-based velocities. Broadly speaking, this technique has the advantage of increased accuracy of determining first breaks' onset times, is able to handle topological change effectively, namely without instances of cycle skipping as illustrated by the fluctuation clusters 206 and 208 in FIG. 2.

In embodiments, an implementation of this technique, using the computing device 104, may involve the inclusion of a contour having a particular shape over a portion of a graphical representation. Additionally, the computing device 104 may, based on a mathematical algorithm, propagate the contour inwards or outwards, or otherwise alter the shape and dimensions of the initial contour (e.g., in all directions) such that the contour gradually approaches a gradient portion (e.g., delineation) of the graphical representation. In other words, the shape of the contour may be iteratively altered until the edges of the contour approaches a specific gradient or boundary within the image. A contour may be designed to have any shape as long as the boundaries of the contour falls within the perimeter of the graphical representation (e.g., a digital image).

Figure 11A:
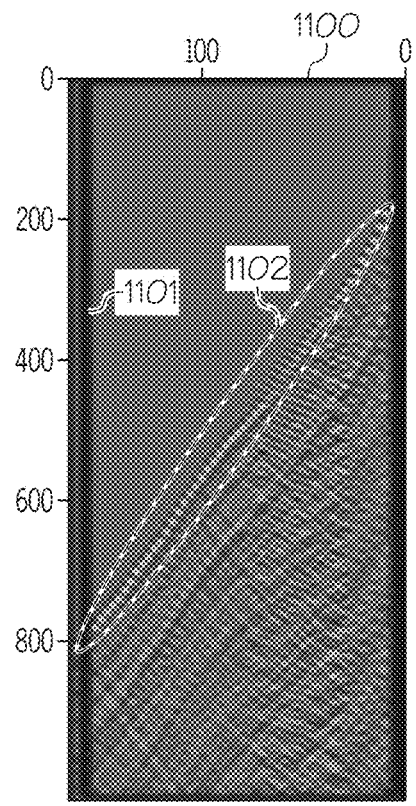
FIG. 11A depicts an example graphical representation of seismic data on which a number of the above mentioned processing steps have been performed, and an edge or delineation has been identified, according to one or more embodiments described and illustrated herein.

FIG. 11A schematically depicts an example graphical representation 1100 of seismic data on which a number of the above mentioned processing steps have been performed, and an area surrounding the first breaks' onset times of the vibration (at the plurality of receivers) has been identified, according to one or more embodiments described and illustrated herein. FIG. 11A depicts an example contour 1101 within which a portion of the processed seismic data is included. The example contour 1101, having the shape of a rectangle, may be the first shape at the initiation of the implementation of the level-sets method based image segmentation operation. It is noted that the example graphical representation 1100 includes an example gradient that is indicated by the marker 1102. The example gradient corresponds to a plurality of first breaks' onset times, which leads to the accurate determination of the first breaks' of the seismic wave or vibration.

Figure 11B:
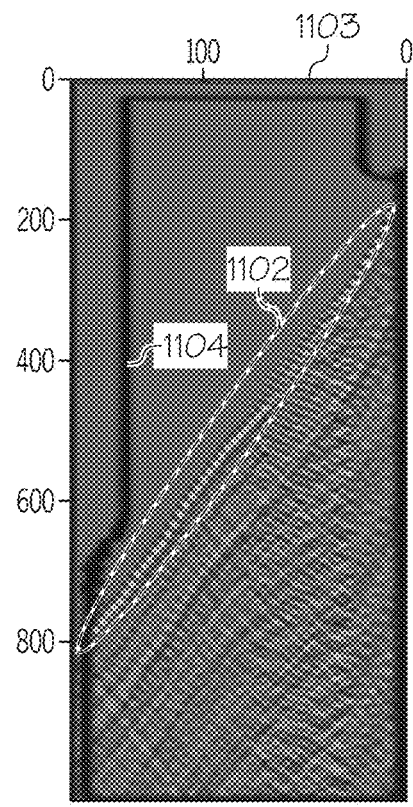
FIG. 11B depicts an example graphical representation in which the dimensions of the example contour of FIG. 11A has been propagated inward, as part of a plurality of iterations, towards the edge or delineation, according to one or more embodiments described and illustrated herein.

FIG. 11B schematically depicts an example graphical representation 1103 in which the dimensions of the example contour 1101 of FIG. 11A has been propagated inward, according to one or more embodiments described and illustrated herein. As illustrated, in an iterative subsequent step of the implementation of the levels sets method by the computing device 104 (e.g., an iterative tracking operation), the dimensions of the contour 1101 are propagated inwards such that boundaries of the contour approaches the example gradient indicated by the marker 1102. The dimensions of the contour in this step of the implementation of the level-sets method may correspond to example contour 1104.

Figure 11C:
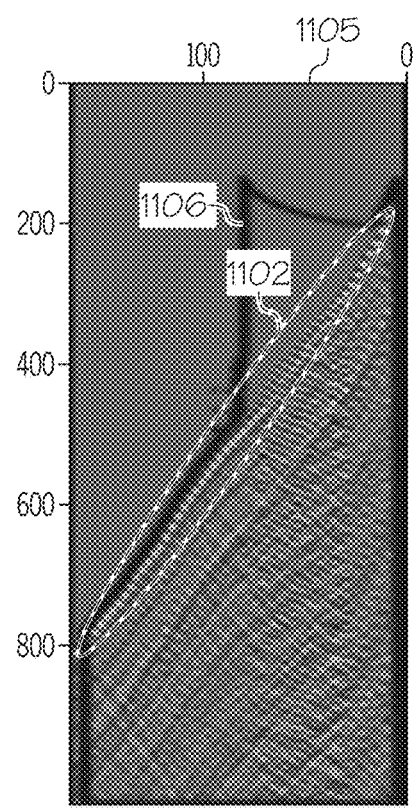
FIG. 11C depicts an example graphical representation in which the dimensions of the example contour of FIG. 11B has been further propagated inward, as part of a plurality of iterations, towards the edge or delineation, according to one or more embodiments described and illustrated herein.

FIG. 11C schematically depicts an example graphical representation 1105 in which the dimensions of the example contour 1104 of FIG. 11B has been further propagated inwards, according to one or more embodiments described and illustrated herein. As illustrated, in an additional iterative subsequent step of the implementation of the levels sets method by the computing device 104 (e.g., an iterative tracking operation following the tracking operation performed as described above and illustrated in FIG. 11B), the dimensions of the contour 1104 are further propagated inward. The latest reduction or alteration in the dimensions of the contour may be such that boundaries of the contour continues to gradually approach the example gradient indicated by the marker 1102. The dimensions of the contour in this step of the implementation of the level-sets method may correspond to example contour 1106.

Figure 11D:
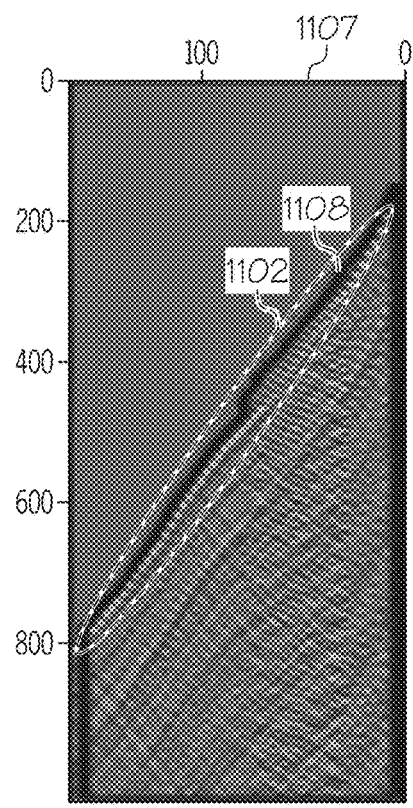
FIG. 11D depicts an example graphical representation in which the dimensions of the example contour of FIG. 11C has been further propagated inward, as part of a plurality of iterations, towards the edge or delineation, such that portions of the example contour of FIG. 11D overlays a delineation, according to one or more embodiments described and illustrated herein.

FIG. 11D schematically depicts an example graphical representation 1107 in which the dimensions of the example contour 1106 of FIG. 11C has been further propagated inwards such that portions of the example contour of FIG. 11D overlays an example gradient of the example graphical representation 1107, according to one or more embodiments described and illustrated herein. In embodiments, in an additional iterative subsequent step of the implementation of the levels sets method by the computing device 104 (e.g., another iterative tracking operation following the tracking operation performed as described above and illustrated in FIG. 11C), the dimensions of the contour 1106 are further propagated inwards. The latest propagation inwards or alteration in the dimensions of the contour may be such that boundaries of the contour approaches and the example gradient indicated by the marker 1102 and a portion of the contour overlays some portion of the example gradient. The dimensions of the contour in this step of the implementation of the level-sets algorithm may correspond to example contour 1108. It is noted that while four steps are described as part of an example implementation of the levels sets algorithm by the computing device 104, a plurality of additional tracking operations may be performed. For example hundreds or thousands of iteratively performed tracking operations may be performed to identify a gradient within a graphical representation (e.g., an image), e.g., a gradient or delineation that corresponds to the first breaks' onset times of a vibration, which then leads to the accurate identification of the first breaks.

Figure 12:
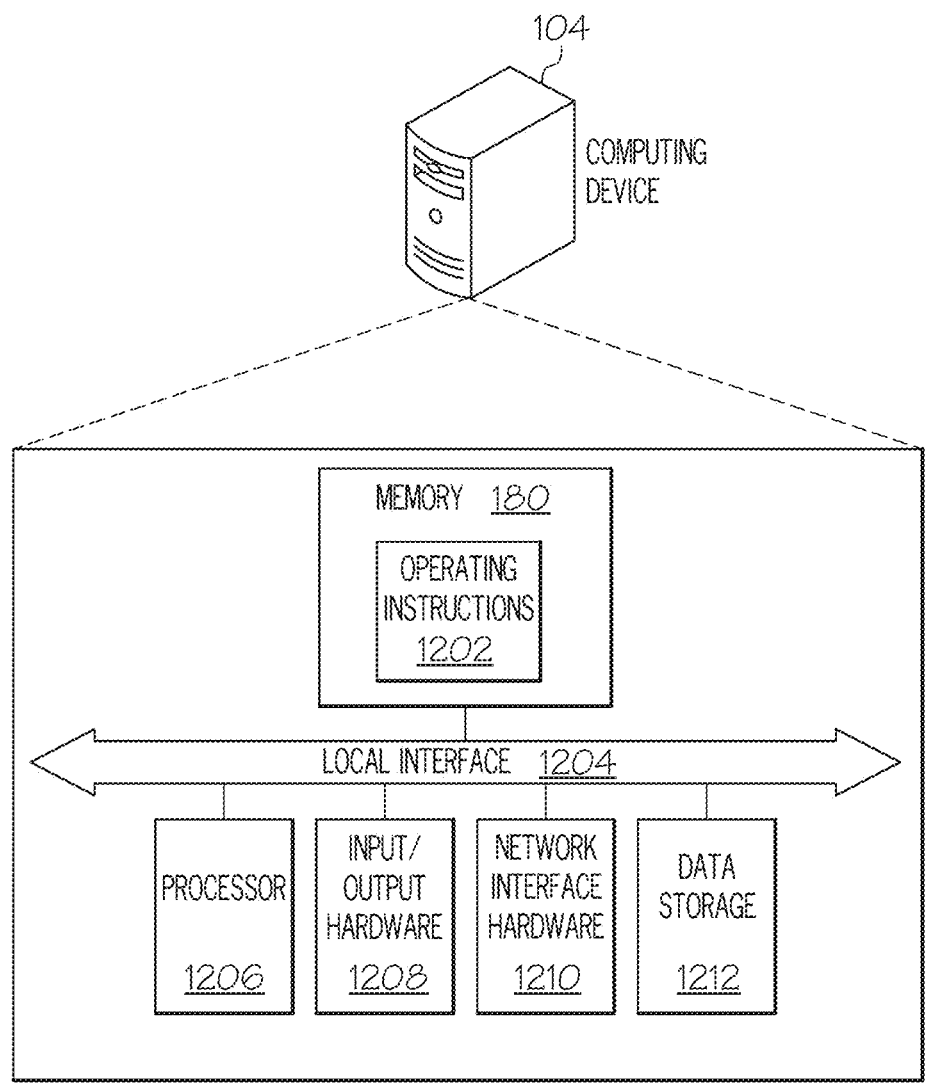
FIG. 12 schematically depicts a non-limiting example of a computing device configured to determine an edge as first breaks (based on a plurality of first breaks' onset times) using one or more front tracking operations as part of an implementation of a level-sets method, according to one or more embodiments described and illustrated herein.

FIG. 12 depicts a non-limiting example of a computing device 104 configured to determine an edge within a graphical representation as first breaks using one or more tracking operations as part of an implementation of a level-sets method, according to one or more embodiments described herein. As illustrated, the computing device 104 includes a processor 1206, input/output hardware 1208, a network interface hardware 1210, a data storage component 1212, and a memory component 180. The memory component 180 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD) (whether local or cloud-based), and/or other types of non-transitory computer-readable medium. Depending on the particular embodiment, these non-transitory computer-readable mediums may reside within the computing device 104 and/or a device that is external to the computing device 104.

The memory component 180 may store instructions 1202, each of which may be embodied as a computer program, firmware, and so forth. A local interface 1204 is also included in FIG. 12 and may be implemented as a bus or other communication interface to facilitate communication among the components of the computing device 104.

The processor 1206 may include any processing component operable to receive and execute instructions 1202 (such as from a data storage component 1212 and/or the memory 180). As described above, the input/output hardware 1208 may include and/or be configured to interface with speakers, microphones, and/or other input/output components.

The operating instructions 1202 may include an operating system and/or other software for managing components of the computing device 104. It should be understood that while the components in FIG. 12 are illustrated as residing within the computing device 104, this is merely an example. In some embodiments, one or more of the components may reside external to the computing device 104 or within other devices. It should also be understood that, while the computing device 104 is illustrated as a single device, this is also merely an example.

As an example, one or more of the functionalities and/or components described herein may be provided by the computing device 104. Depending on the particular embodiment, any of these devices may have similar components as those depicted in FIG. 12. To this end, any of these devices may include instructions for performing the functionality described herein.

It should now be understood that certain embodiments described herein are directed to a method for determining and tracking of one or more instances of first breaks in processed seismic data. The method includes obtaining seismic data associated with subsurface formations, the seismic data relating to a vibration contacting a plurality of portions of the subsurface formations, processing the seismic data to produce processed seismic data comprising one or more attributes, wherein the processed seismic data defines an edge characterizing first breaks, iteratively performing, using a level sets algorithm, a plurality of tracking operations on the processed seismic data to identify the edge characterizing the first breaks, and determining the edge as the first breaks' onset times.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method implemented by one or more processors of a computing device, the method comprising:
   obtaining seismic data associated with a surface and subsurface formations, the seismic data relating to a vibration contacting a plurality of portions of the surface and subsurface formations;
   processing the seismic data to produce processed seismic data comprising one or more attributes, wherein the processed seismic data defines an edge characterizing a plurality of first breaks onset times;
iteratively performing, using a level sets algorithm, a plurality of tracking operations on the processed seismic data to identify the edge characterizing the plurality of first breaks onset times; and
determining the edge as first breaks.

2. The method of claim 1, wherein the processing of the seismic data includes transforming, based on a Hilbert Transform algorithm, the seismic data into the one or more attributes, the one or more attributes comprising one or more of envelope attribute, instantaneous frequency attribute, and instantaneous phase attribute.

3. The method of claim 2, wherein iteratively performing the plurality of tracking operations on the processed seismic data includes:
generating, by the one or more processors, a graphical representation based on the transformed seismic data; and
generating, by the one or more processors, a contour over a portion of the graphical representation based on the transformed seismic data, a discontinuity included within a boundary of the contour.

4. The method of claim 3, wherein the determining of the edge as the first breaks includes:
modifying, by the one or more processors, dimensions of the contour such that the contour approaches a location of the discontinuity in the graphical representation, the discontinuity corresponding to the first breaks of the seismic data.

5. The method of claim 1, wherein the processing of the seismic data further comprises applying one or more edge smoothing processes to the one or more attributes.

6. The method of claim 5, wherein the one or more edge smoothing processes comprises one or more of de-trending, scaling, and normalization processes.

7. The method of claim 5, wherein the processing of the seismic data further comprises eliminating distortions in the seismic data.

8. The method of claim 1, further comprising:
generating the seismic data by:
generating the vibration from a source location;
detecting, by one or more sensors positioned at destination locations, arrival times associated with the vibration; and
determining, based on distances between the source location and the destination locations and the arrival times, velocities associated with the subsurface formations.

9. The method of claim 8, wherein the velocities correspond to speeds at which the vibration propagates through the plurality of portions of the subsurface formations prior to being detected by the one or more sensors.

10. A non-transitory computer-readable medium storing instructions that, when executed by one or more processors of a computing device, cause the computing device to:
obtain seismic data associated with a surface and subsurface formations, the seismic data relating to a vibration contacting a plurality of portions of the surface and subsurface formations;
process the seismic data to produce processed seismic data comprising one or more attributes, wherein the processed seismic data defines an edge characterizing a plurality of first breaks onset times;
iteratively perform, using a level sets algorithm, a plurality of tracking operations on the processed seismic data to identify the edge characterizing the plurality of first breaks onset times; and
determine the edge as first breaks.

11. The non-transitory computer-readable medium of claim 10, wherein the non-transitory computer-readable medium storing instructions, when executed by the one or more processors of the computing device, cause the computing device to transform, based on a Hilbert Transform algorithm, the seismic data into the one or more attributes, the one or more attributes comprising one or more of envelope attribute, instantaneous frequency attribute, and instantaneous phase attribute.

12. The non-transitory computer-readable medium of claim 11, wherein the non-transitory computer-readable medium storing instructions, when executed by the one or more processors of the computing device, cause the computing device to iteratively performing the plurality of tracking operations on the processed seismic data includes:
generating, by the one or more processors, a graphical representation based on the transformed seismic data; and
generating, by the one or more processors, a contour over a portion of the graphical representation based on the transformed seismic data, a discontinuity included within a boundary of the contour.

13. The non-transitory computer-readable medium of claim 12, wherein the non-transitory computer-readable medium storing instructions, when executed by the one or more processors of the computing device, cause the computing device to determine the edge as the first breaks by modifying, by the one or more processors, dimensions of the contour such that the contour approaches a location of the discontinuity in the graphical representation, the discontinuity corresponding to the first breaks of the seismic data.

14. The non-transitory computer-readable medium of claim 10, wherein the non-transitory computer-readable medium storing instructions, when executed by the one or more processors of the computing device, cause the computing device to process the seismic data by applying one or more edge smoothing processes to the one or more attributes.

15. The non-transitory computer-readable medium of claim 14, wherein the one or more edge smoothing processes comprises one or more of de-trending, scaling, and normalization processes.

16. The non-transitory computer-readable medium of claim 14, wherein the non-transitory computer-readable medium storing instructions, when executed by the one or more processors of the computing device, cause the computing device to process the seismic data by eliminating distortions in the seismic data.

17. The non-transitory computer-readable medium of claim 10, wherein the non-transitory computer-readable medium storing instructions, when executed by the one or more processors of the computing device, further cause the computing device to generate the seismic data by:
generating the vibration from a source location;
detecting, by one or more sensors positioned at destination locations, arrival times associated with the vibration; and
determining, based on distances between the source location and the destination locations and the arrival times, velocity values associated with the vibration.

18. The non-transitory computer-readable medium of claim 17, wherein the velocity values correspond to speeds at which the vibration contacts the plurality of portions of the subsurface formations prior to being detected by the one or more sensors.

19. A method comprising:
 processing seismic data to produce processed seismic data comprising one or more attributes, wherein the processed seismic data defines an edge characterizing a plurality of first breaks onset times;
 iteratively performing, using a level sets algorithm, a plurality of tracking operations on the processed seismic data to identify the edge characterizing the plurality of first breaks onset times; and
 determining the edge as first breaks.

20. The method of claim 19, wherein the processing of the seismic data includes transforming, based on a Hilbert Transform algorithm, the seismic data into the one or more attributes, the one or more attributes comprising one or more of envelope attribute, instantaneous frequency attribute, and instantaneous phase attribute.

* * * * *